(12) United States Patent
Carnevali (10) Patent No.: US 8,177,178 B2
(45) Date of Patent: May 15, 2012

(54) DUAL ATTACHMENT BASE FOR CRADLE

(76) Inventor: Jeffrey D. Carnevali, Seattle, WA (US)

(\*) Notice: Subject to any disclaimer, the term of this patent is extended or adjusted under 35 U.S.C. 154(b) by 1058 days.

(21) Appl. No.: 12/148,902

(22) Filed: Apr. 22, 2008

(65) Prior Publication Data

US 2009/0140113 A1 Jun. 4, 2009

Related U.S. Application Data (63) Continuation-in-part of application No. 11/998,699, filed on Nov. 30, 2007, now abandoned.

(51) Int. Cl.
*A47K 1/00* (2006.01)
(52) U.S. Cl. .. 248/220.22; 24/618; 24/701; 24/DIG. 31; 248/223.41; 403/329
(58) Field of Classification Search ............. 248/220.22, 248/220.21, 223.41, 276.1, 288.31; 411/522, 411/104, 508, 913; 403/326, 329; 24/701, 24/618, 623, DIG. 31
See application file for complete search history.

(56) References Cited

U.S. PATENT DOCUMENTS

| | | | | |
|---|---|---|---|---|
| 3,928,894 A | * | 12/1975 | Bury et al. | 248/467 |
| 5,845,885 A | * | 12/1998 | Carnevali | 248/181.1 |
| 5,988,572 A | * | 11/1999 | Chivallier et al. | 248/176.1 |
| 6,053,384 A | * | 4/2000 | Bachman | 224/430 |
| 6,322,282 B1 | * | 11/2001 | Kussman et al. | 403/329 |
| 7,017,243 B2 | * | 3/2006 | Carnevali | 24/523 |
| 7,178,206 B2 | * | 2/2007 | Kuhnle et al. | 24/297 |
| 7,277,240 B2 | * | 10/2007 | Carnevali | 359/802 |
| 2002/0015617 A1 | * | 2/2002 | Schwenkel et al. | 403/329 |
| 2006/0198694 A1 | * | 9/2006 | Weiser et al. | 403/329 |
| 2007/0217890 A1 | * | 9/2007 | Scroggie et al. | 411/508 |
| 2007/0258795 A1 | * | 11/2007 | Nakazato | 411/508 |
| 2008/0050202 A1 | * | 2/2008 | Liu | 411/508 |

\* cited by examiner

*Primary Examiner* — Ramon Ramirez
(74) *Attorney, Agent, or Firm* — Charles J. Rupnick (57) ABSTRACT

A novel device cradle formed with a substantially rigid spine with a device rest and a spaced apart device retainer formed on a front surface of the spine and adjacent to opposite first and second end thereof. A dual attachment base of the novel device cradle is formed on a back surface of the spine opposite from the front surface thereof and is positioned between the first and second ends thereof. The dual attachment base has a raised attachment plate that is spaced away from the back surface of the spine, a pair of spaced apart fastener attachment holes that are formed through the attachment plate and positioned adjacent to opposite front and back surfaces of the spine, and a pair of spaced apart T-slots that are formed through the attachment plate and positioned substantially between the attachment holes.

20 Claims, 10 Drawing Sheets

DUAL ATTACHMENT BASE FOR CRADLE

This application is a Continuation-in-part and claims priority benefit of parent U.S. patent application Ser. No. 11/998, 699 filed in the name of Jeffrey D. Carnevali on Nov. 30, 2007 now abandoned, the complete disclosure of which is incorporated herein by reference.

FIELD OF THE INVENTION

The present invention relates generally to cradle for securely cradling, and optionally electrically interfacing, portable devices, and in particular to mechanisms for attaching such device cradles to a plurality of different external presentation apparatus.

BACKGROUND OF THE INVENTION

T-slot connector plates and mating T-slot adaptors are generally well-known for temporary mounting of cellular telephone, satellite radio and other portable electronic devices to T-slot mounting apparatus on building walls and in automobiles as well as other vehicles.

Figure 1:
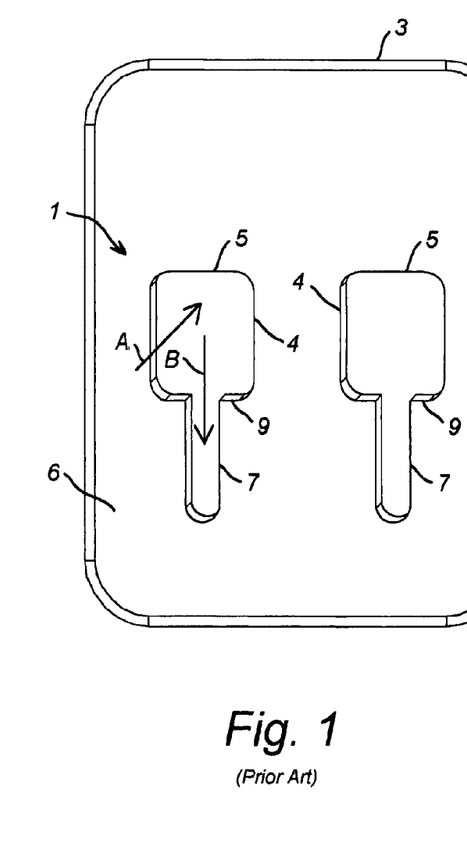
FIG. 1 illustrates one embodiment of a T-slot connector plate of the prior art being incorporated into a cradle for mounting a portable or cellular telephone, satellite radio or another portable electronic device.

FIG. 1 illustrates one embodiment of a T-slot connector plate 1 incorporated into a cradle 3 for mounting a portable or cellular telephone, satellite radio or another portable electronic device. As illustrated here, the T-slot connector plate may include more than one T-slot. For example, two T-slots, as shown, form a dual T-slot connector plate 1. As illustrated here, the female T-slot connector plate 1 is formed with a pair of T-slots 4 each having a large substantially rectangular aperture 5 through an interface surface 6, with a channel portion 7 extending from one edge 9 and communicating with the aperture 5. The rectangular aperture 5 and channel portion 7 extending therefrom respectively receive and releasably capture a mating portion of the T-slot adaptor.

However, known T-slot adaptors are generally permanently mounted, e.g. screwed or otherwise attached to a wall or other vehicle surface. Known T-slot adaptors are thus limited in their ability to provide efficient and reliable expansion capability for combining in a chain with other mounting devices.

SUMMARY OF THE INVENTION

The present invention is a novel device cradle for securely cradling, and optionally electrically interfacing, different cellular telephones, hand-held pocket-sized personal computers, commonly referred to as "pocket PCs," and other mobile electronic devices, such as mobile global positioning system (GPS) receivers, Personal Digital Accessories (PDAs) and other mobile electronic devices of the type generally.

The novel device cradle is configured with a novel dual attachment base for alternately securing the device cradle to a plurality of different external presentation apparatus, such as but not limited to different relatively positionable mounting platforms of both permanently attached screw-on types, and temporarily attached slip-on types.

According to one aspect of the novel device cradle, the novel device cradle includes a substantially rigid spine with a device rest and a spaced apart device retainer formed on a front surface of the spine and adjacent to opposite first and second end thereof A dual attachment base is formed on a back surface of the spine opposite from the front surface thereof and is positioned between the first and second ends thereof The dual attachment base includes: a raised attachment plate that is spaced away from the back surface of the spine, a pair of spaced apart fastener attachment holes that are formed through the attachment plate and positioned adjacent to opposite front and back surfaces of the spine, and a pair of spaced apart T-slots that are formed through the attachment plate and positioned substantially between the attachment holes.

According to another aspect of the novel device cradle, the pair of attachment holes formed through the attachment plate are further oriented substantially diagonal of the spine and the pair of T-slots. Furthermore, the dual attachment base is further configured with a plurality of side walls formed between the back surface of the spine and the raised attachment plate, the side walls spacing the raised attachment plate away from the second side of the spine and forming the relief between the front surface of the spine and the interior surface of the attachment plate at least in areas adjacent to the pair of T-slots. The dual attachment base is also configured with a stiffener formed between the spaced apart T-slots, with the stiffener forming a channel extended between both the spaced apart T-slots and the fastener attachment holes. The dual attachment base also includes a relief, such as a substantially hexagonal relief, substantially surrounding each of the pair of attachment holes between the front surface of the spine and an interior surface of the attachment plate.

According to another aspect of the novel device cradle, one of either the device rest or the spine further includes a connector access port. When the connector access port is formed through the spine, the connector access port is formed between the dual attachment base and one of either the first or second ends of the spine.

According to another aspect of the novel device cradle, a method is disclosed for mounting a device cradle, the method is practiced using a device cradle configured with a pair of spaced apart fastener holes formed in an attachment plate thereof and a pair of spaced apart T-slots also formed through the attachment plate. The method includes fitting each of the T-slots over respective T-slot connectors and securing the T-slots relative to the respective T-slot connectors; and alternately joining a first positionable mounting platform to the attachment plate, including coupling a pair of fasteners between the pair of fastener holes in the attachment plate and an attachment base portion of the first positionable mounting platform with a first part-spherical coupler of the first positionable mounting platform projected away from the attachment plate.

According to another aspect of the method for mounting a device cradle, the fitting of each of the T-slots over respective T-slot connectors further includes fitting each of the T-slots over respective T-slot connectors of a quick release T-slot adaptor comprising the T-slot connectors formed on a first surface of a substantially rigid adaptor base plate thereof.

According to another aspect of the method for mounting a device cradle, the method further includes projecting a second part-spherical coupler away from a second surface of the adaptor base plate of the quick release T-slot adaptor opposite from the first surface thereof.

According to another aspect of the method for mounting a device cradle, the projecting of a second part-spherical coupler away from a second surface of the adaptor base plate further includes securing a second positionable mounting platform comprising the second part-spherical coupler to the adaptor base plate with an attachment base portion of the second positionable mounting platform adjacent to the second surface of the adaptor base plate and the second part-spherical coupler projected away from the second surface of the adaptor base plate on the attachment plate of the second positionable mounting platform.

According to another aspect of the method for mounting a device cradle, the method further includes, with the second positionable mounting platform having the second part-spherical coupler being secured to the adaptor base plate with the attachment base portion thereof being adjacent to the second surface of the adaptor base plate and the second part-spherical coupler projected away from the second surface of the adaptor base plate, then substantially capturing the second part spherical coupler in a relatively rotatable relationship with a socket of a universal mounting apparatus.

According to yet another aspect of the method for mounting a device cradle, the method further includes, with the first positionable mounting platform joined to the attachment plate with the first part-spherical coupler projected away from the attachment plate thereof, then substantially capturing the first part spherical coupler in a relatively rotatable relationship with a socket of a universal mounting apparatus.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 20 and 21 are elevation views of the novel device cradle illustrated in FIGS. 18 and 19, wherein FIG. 20 shows a relief or "pocket" formed between an attachment plate of the novel dual attachment base and a front surface of the cradle's spine, and FIG. 21 shows the attachment plate from its outer surface; and FIGS. 22 and 23 are pictorial views of the novel device cradle illustrated in FIGS. 18 and 19 and fitted with an electronics interface module or connector coupled into an access port thereof, wherein FIG. 22 shows the attachment plate being prepared to receive the T-slot connectors of the novel quick release T-slot adaptor into the pair of T-slots, and FIG. 23 shows the attachment plate having the diamond-shaped base plate of the ball mount mounting platform mounted on its outer surface with two screw fasteners.

DETAILED DESCRIPTION OF PREFERRED EMBODIMENT

In the Figures, like numerals indicate like elements.

Figure 2:
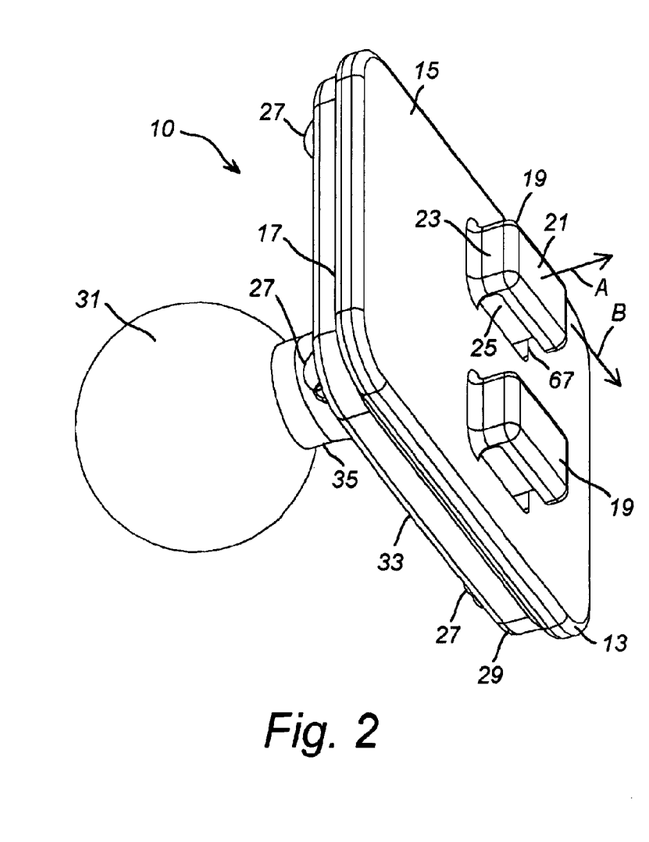
FIG. 2 is a perspective view that illustrates the invention embodied by example and without limitation as a novel quick release T-slot adaptor.

FIG. 2 is a perspective view that illustrates the invention embodied by example and without limitation as a novel quick release T-slot adaptor 10. As illustrated here, the quick release T-slot adaptor 10 includes a substantially rigid adaptor base plate 13 having first and second substantially planar and parallel spaced apart opposing surfaces 15 and 17. For example, the adaptor base plate 13 is optionally formed of a substantially rigid material, including but not limited to, an injection molded plastic or metal material. The T-slot adaptor 10 is formed with one or more substantially rigid T-slot connectors 19 entirely integral with the adaptor base plate 13. As illustrated here, the T-slot adaptor 10 includes two of the entirely integral T-slot connectors 19. The T-slot adaptor 10 illustrated thus forms a dual T-slot adaptor operable with a mating dual T-slot connector plate 1 of the prior art.

As more clearly illustrated in subsequent figures, each of the one or more T-slot connectors 19 includes a hook plate 21 spaced away from the first surface 15 of the adaptor base plate 13 and formed substantially parallel therewith. A substantially rigid stop plate 23 is extended substantially perpendicularly between the hook plate 21 and the first surface 15 of the adaptor base plate 13. A substantially rigid guide plate 25 is positioned substantially central of the hook plate 21 and extended substantially perpendicularly between the hook plate 21 and the first surface 15 of the adaptor base plate 13. The guide plate 25 is further formed substantially perpendicular to the stop plate 23.

As illustrated by respective arrows A and B, the male T-slot adaptor 10 is connected to the female T-slot connector plate 1 as follows. As illustrated by arrow A, with the stop plate 23 opposite from the channel portion 7 of the T-slot 4 and the guide plate 25 adjacent thereto, the hook plate 21 of the T-slot connector 19 is inserted into the female aperture 5 until the first surface 15 of the adaptor base plate 13 is substantially seated against the interface surface 6. The guide plate 25 of the T-slot connector 19 is thereby substantially aligned with the channel portion 7 of the T-slot 4. Thereafter, as illustrated by arrow B, the entire T-slot adaptor 10 is moved relative to the T-slot connector plate 1, with the first surface 15 of the adaptor base plate 13 sliding along the interface surface 6 of the female T-slot connector plate 1 in the direction of the channel portion 7. The guide plate 25 of the T-slot connector 19 is slipped into the mating channel portion 7 until the stop plate 23 encounters the edge 9 of the aperture 5, whereby the hook plate 21 is captured behind the interface surface 6 with portions of the T-slot connector plate 1 inserted between the adaptor base plate 13 of the T-slot adaptor 10 and its spaced-away hook plate 21.

The T-slot adaptor 10 also includes one or more quick release connectors 27 integrated with the second surface 17 of the adaptor base plate 13 opposite from the T-slot connectors 19. By example and without limitation, a plurality of the quick release connectors 27 is illustrated here as connecting an external mounting device 29 to the second surface 17 of the adaptor base plate 13. The mounting device 29 is illustrated here by example and without limitation as a ball-and-socket coupler of the type disclosed by example and without limitation in U.S. Pat. No. 5,845,885, "Universally Positionable Mounting Device" issued to the inventor of the present invention on Dec. 8, 1998, which is incorporated herein by reference. Accordingly, the mounting device 29 includes a radially compressible ball portion 31 formed as a partial sphere of resiliently deformable material such as a nitrile rubber material. The ball portion 31 of such a ball-and-socket coupler-type mounting device 29 is extended from a substantially rigid base plate 33 on a substantially rigid stem or neck 35 of smaller diameter than the ball portion 31.

Figures 3, 4, 5:
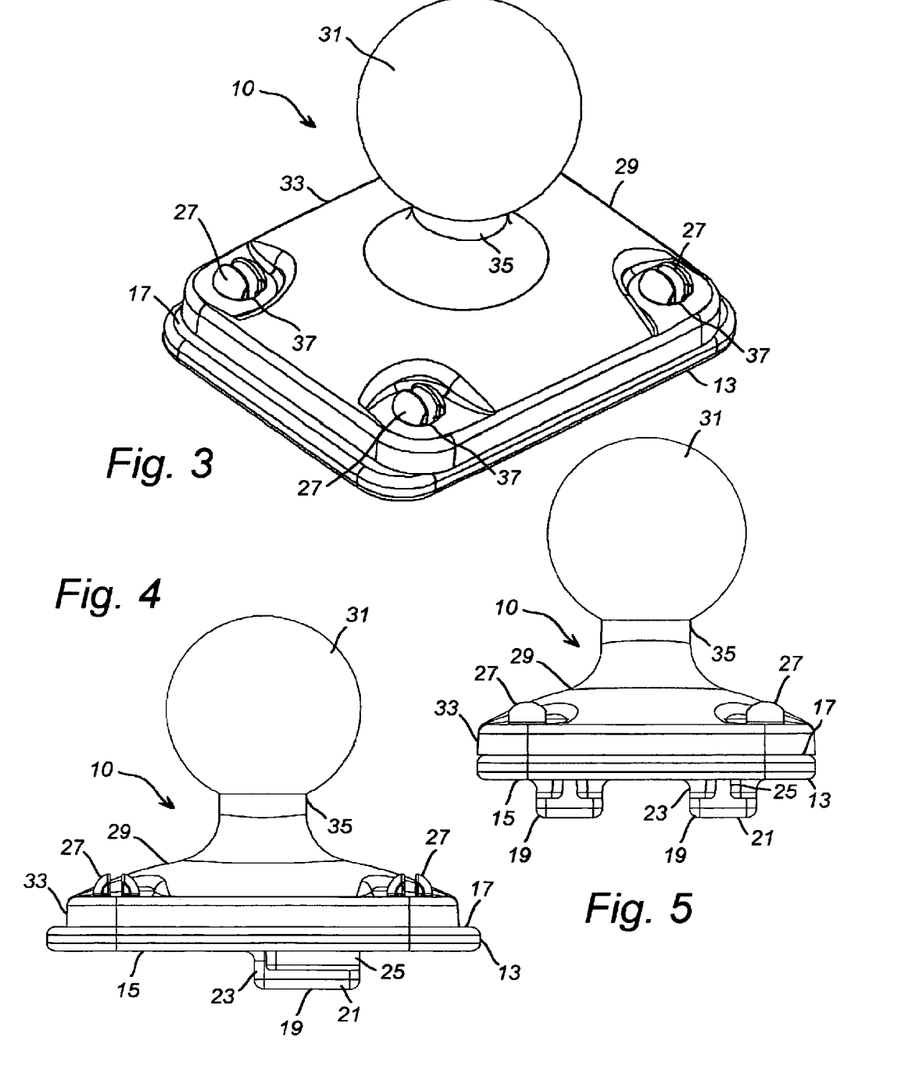
FIG. 3 is a perspective view that illustrates an external mounting device connected to an adaptor base plate portion of the novel quick release T-slot adaptor and having a plurality of quick release connectors.
FIG. 4 is a side view showing the mounting device connected the adaptor base plate of the novel quick release T-slot adaptor using the plurality of quick release connectors.
FIG. 5 is an end view showing the mounting device connected the adaptor base plate of the novel quick release T-slot adaptor using the plurality of quick release connectors.

FIG. 3 is a perspective view that illustrates the external mounting device 29 connected to the second surface 17 of the adaptor base plate 13 with the plurality of quick release connectors 27. As illustrated here, each of the quick release connectors 27 inserts through an aperture 37 in the base plate 33 of the mounting device 29 for connecting it to the second surface 17 of the T-slot adaptor's adaptor base plate 13 in a quick release fashion.

FIG. 4 is a side view showing the external mounting device 29 connected the adaptor base plate 13 with the plurality of quick release connectors 27. As illustrated here and in the end view of FIG. 5, in addition to connecting the mounting device 29 to the adaptor base plate 13, the plurality of quick release connectors 27 firmly seat the base plate 33 of the mounting device 29 against the second surface 17 of the adaptor base plate 13.

Figure 6:
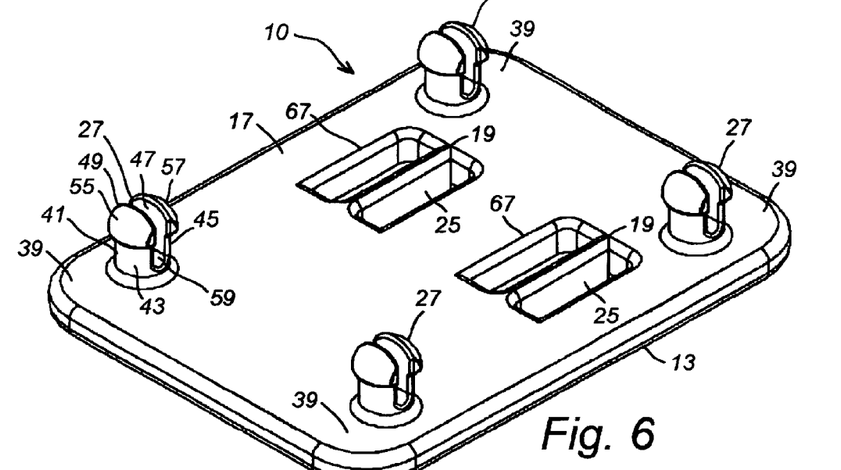
FIG. 6 is an isometric view that shows one exemplary embodiment of the novel quick release T-slot adaptor.

FIG. 6 is an isometric view that shows one exemplary embodiment of the T-slot adaptor 10 illustrated here by example and without limitation as being a dual T-slot adaptor having two of the integral T-slot connectors 19 positioned side-by-side in a substantially symmetrical relationship with respect to the adaptor base plate 13. Here, the adaptor base plate 13 is illustrated by example and without limitation as being substantially rectangular in shape with four of the quick release connectors 27, one in each corner 39 of the adaptor base plate 13.

As illustrated here by example and without limitation, the quick release connectors 27 are bullet nose connectors that are slotted for resilient compressibility. For example, when embodied as bullet nose connectors, the connectors 27 are formed with split or slotted trunks 41 each topped with a split bullet nose 49 spaced away from the second surface 17 of the adaptor base plate 13 opposite from the T-slot connectors 19. The bullet noses 39 of the respective quick release connectors 27 are oversized relative to the apertures 37 in the base plate 33 of the mounting device 29, while the trunks 41 are sized to fit substantially snuggly within the apertures 37 and are of a length selected to space the bullet noses 39 away from the adaptor base plate 13 sufficiently to fit the base plate 33 of the mounting device 29 therebetween.

Each trunk 41 has a pair of substantially identical stems 43, 45 that are substantially symmetrically spaced apart by a longitudinal slot 47 extending nearly to the adaptor base plate 13. The slot 47 extends through the bullet nose 49, thereby dividing it into a pair of substantially identical bullet nose portions 55, 57 that are substantially symmetrically spaced apart by the longitudinal slot 47. The slot 47 permits the stems 43, 45 of the trunk 41 to resiliently bend inward toward one another, which bending also permits the spaced-apart nose portions 55, 57 of the bullet nose 49 to move toward one another when the aperture 37 in the base plate 33 of the mounting device 29 is pressed over it. As the aperture 37 is pressed substantially simultaneously over each of the bullet nose connectors 27, a curved contour of the bullet nose 49 cooperates with the aperture 37 to compress the nose portions 55, 57 across the intervening slot 47 from their normally spaced apart positions, such compressing of the nose portions 55, 57 being aided by resilient bending of the stem portions 43, 45 of the trunk 41 of the respective quick release connectors 27. When the base plate 33 of the mounting device 29 is seated against the second surface 17 of the adaptor base plate 13 of the T-slot adaptor 10, the bullet noses 39 of the respective quick release connectors 27 effectively clear and "pop" out of the apertures 37. The bent stem portions 43, 45 of the respective trunks 41 resiliently straighten to their normally spaced apart positions, whereby the compressed nose portions 55, 57 uncompress and spread apart to their normally spaced apart positions. The relatively oversized bullet noses 39 of the respective quick release connectors 27 effectively capture the base plate 33 of the mounting device 29 snuggly against the second surface 17 of the adaptor base plate 13 of the T-slot adaptor 10, as illustrated in previous figures.

Figure 7:
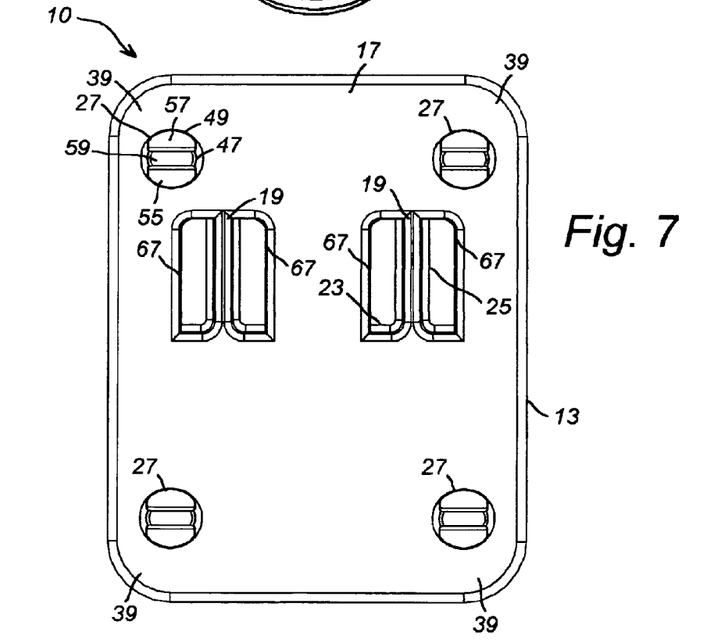
FIG. 7 is a view of the novel quick release T-slot adaptor that illustrates a second surface of the adaptor base plate.

FIG. 7 is a view of the T-slot adaptor 10 showing the second surface 17 of the adaptor base plate 13. The quick release connectors 27 are shown as projecting from the second surface 17 of the adaptor base plate 13 and being substantially uniformly distributed adjacent to respective corners 39 thereof, and the pair of T-slot connectors 19 is shown as projecting away from the first surface 15.

Figure 8:
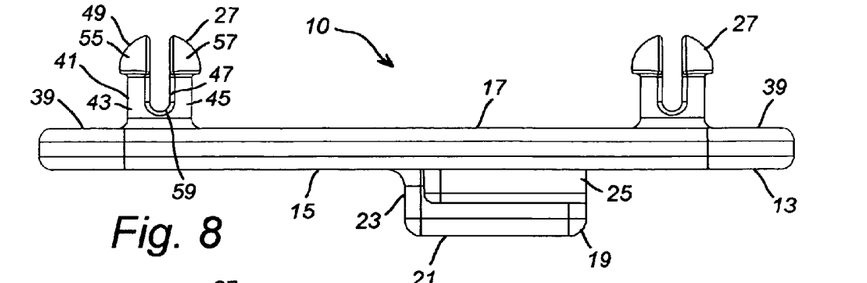
FIGS. 8 and 9 are respective side elevation and cross-section views of the novel quick release T-slot adaptor.
Figure 9:
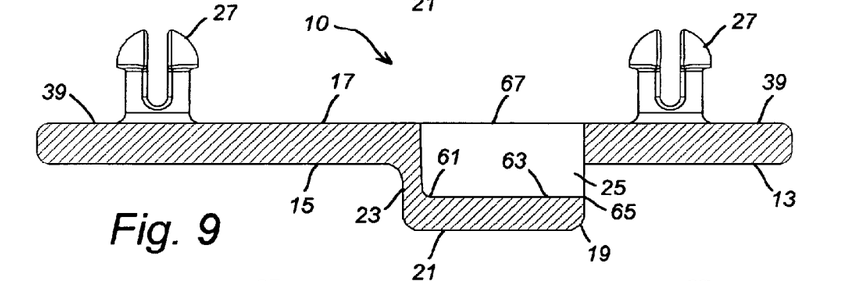

FIGS. 8 and 9 are side elevation and cross-section views, respectively, of the T-slot adaptor 10 that more clearly show the details of the T-slot connectors 19 and quick release connectors 27 as discussed herein. As detailed here, the substantially longitudinal slots 47 in the respective quick release connectors 27 substantially bisect the trunk 41 and bullet nose 49 portions into respective spaced apart stem portions 43, 45 and nose portions 55, 57. The slots 47 extend nearly to the second surface 17 of the adaptor base plate 13 and terminate in curved throat portions 59 that operate as stress relief's to avoid damaging the trunk 41 otherwise caused by resilient bending together of the spaced apart stem portions 43, 45 during insertion of the bullet nose 49 into the aperture 37.

The hook plate 21 of the T-slot connector 19 is more clearly shown as being spaced away from the first surface 15 of the adaptor base plate 13 and formed substantially parallel therewith. The stop plate 23 is more clearly shown as being extended substantially perpendicularly between an inside edge 61 of the hook plate 21 and the first surface 15 of the adaptor base plate 13, with the guide plate 25 being extended from of the stop plate 23 along an inner surface 63 of the hook plate 21 and terminating at an outer edge 65 thereof opposite from the stop plate 23.

Figure 10:
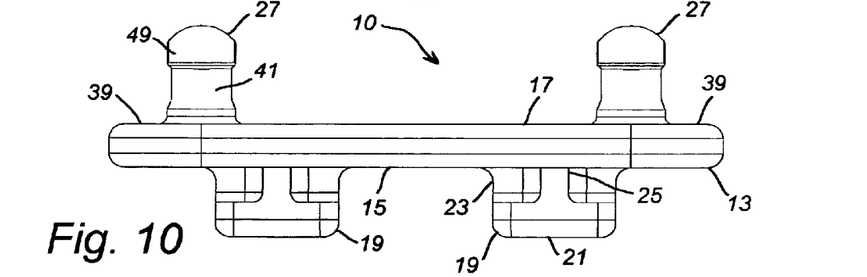
FIGS. 10 and 11 are respective end elevation and cross-section views of the novel quick release T-slot adaptor.
Figure 11:
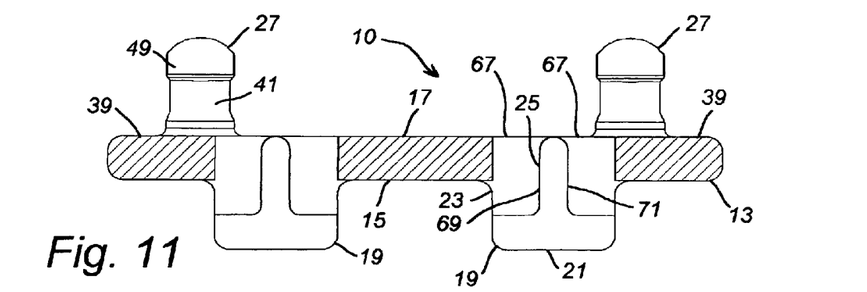

FIGS. 10 and 11 are end elevation and cross-section views, respectively, of the T-slot adaptor 10 that more clearly show the details of the T-slot connectors 19 and quick release connectors 27 as discussed herein. As detailed here, slots or other apertures 67 are optionally formed through the adaptor base plate 13 in alignment with the hook plate 21 of the T-slot connector 19 and extending on opposite sides 69, 71 of the guide plate 25 to ease manufacturing of the T-slot adaptor 10, for example, by injection molding.

Additional Configurations

Cradles are generally well-known for securely cradling, and optionally electrically interfacing, cellular telephones, hand-held pocket-sized personal computers, commonly referred to as "pocket PCs," and other mobile electronic devices, such as mobile global positioning system (GPS) receivers, Personal Digital Accessories (PDAs) and other mobile electronic devices of the type generally.

Figures 12, 13:
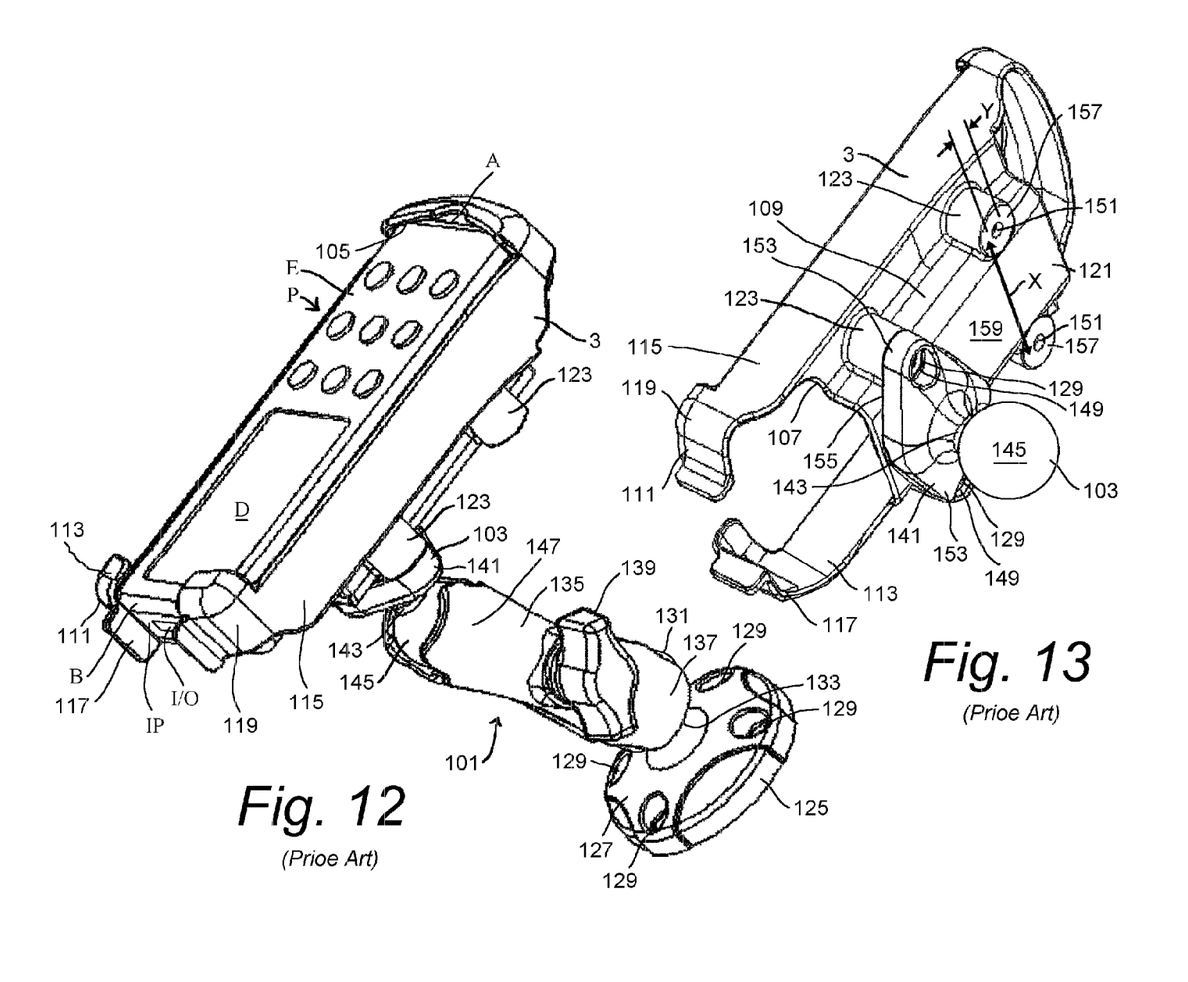
FIG. 12 illustrates an example of a passive device cradle of a type disclosed in the prior art.
FIG. 13 is another view of the device cradle illustrated in FIG. 12.

FIG. 12 illustrates one such passive device cradle 3 of a type disclosed by example and without limitation in U.S. Pat. No. 7,277,240, INTERMEDIATELY MOUNTED MAGNIFICATION APPARATUS, issued Oct. 2, 2007, to the inventor of the present invention, which is incorporated herein by reference.

Also generally well-known are universally positionable ball-and-socket or other mounting apparatus 101 adapted for mounting the device cradle 3. Such universal mounting devices are known for providing a positionable mounting platform in and on different industrial and commercial platforms, including floors, walls, work bench surfaces, and vehicles. These universally positionable mounting platforms are typically structured to support a wide variety of tools and other mobile devices too heavy for conventional mounting devices of the type disclosed in U.S. Pat. No. 5,845,885, UNIVERSALLY POSITIONABLE MOUNTING DEVICE, issued Dec. 8, 1998, to the inventor of the present invention, which is incorporated herein by reference.

Therefore, as illustrated here this device cradle 3 is adapted for releasably securing a mobile electronic device E and is further adapted for being mounted to a surface, for example, a relatively positionable mounting platform 103 of universal mounting apparatus 101 of the type disclosed in U.S. Pat. No. 5,845,885 and herein.

This pictorial view illustrates a device cradle 3 of a type configured for cradling the mobile electronic device E which is, for example, of a type having an optically viewable display screen D and control key pad P. A device rest 105 is formed on a front surface 107 of a rigid spine portion 109 of the device cradle 3 provides footing for the mobile electronic device E, and a device retainer structure 111 securely retains the mobile electronic device E against the footing in a manner that permits the user a useful viewing relationship with the display screen D and a manipulating relationship with the facial key pad P. By example and without limitation, the device rest 105 is formed as a receiver cavity or "pocket" is sized to receive a portion A of one or more different normally handheld portable electronic devices E.

By example and without limitation, the retainer structure 111 shown here is provided by a pair of opposing arms 113, 115 that are resiliently expandable for receiving the electronic device E and include respective head portions 117, 119 contoured to fit around a portion B of the electronic device E opposite from the receiver pocket 105.

Additionally, a back surface 121 of the spine portion 109 includes attachment structure 123 for securing the device cradle 3 to an external presentation apparatus, such as the relatively positionable mounting platform 103. For example, as illustrated herein and described in U.S. Pat. No. 5,845,885, which is incorporated by reference herein, universal mounting apparatus 101 is founded on a stationary base platform 125 having an anchor base 127 that is secured to a fixed surface with a quantity of screws or other fasteners 129. A part-spherical coupler 131 of resiliently compressible material is presented on a stem 133 for access by a pair of clamping arms 135 that together form a socket 137 that is positionally secured relative to the part-spherical coupler 131 when a clamping mechanism 139 is tightened. The positionable mounting platform 103 includes an attachment base 141 presented on another stem 143. The second stem 143 is projected from a second part-spherical coupler 145 of resiliently compressible material that is captured in a second socket 147 formed at the opposite end of the clamping arms 135 and relatively positionally secured by increased tightening of the clamping mechanism 139. The positionable mounting platform 103 is optionally structured for attachment of any of the above variety of device cradles or another cradle or structure of the user's choice. For example, the attachment base 141 of the positionable mounting platform 103 is shown here as being optionally structured having a diamond-shaped base formed with a pair of clearance holes 149 spaced apart on opposite sides of the stem 143 that projects the second part-spherical coupler 145. The clearance holes 149 are structured for receiving a pair of the screws or other fasteners 129 for attachment of any of the above variety of device cradles or another cradle or structure of the user's choice to substantially planar attachment surface 11 of the positionable mounting platform 103. As illustrated herein, the diamond-shaped attachment base 141 of the mounting platform 103 is secured to the attachment structure 123 of the device cradle 3. For example, the pair of screws or other fasteners 129 is secured to apertures 151 in the attachment structure 123, which are each structured to receive such a conventional fastener.

FIG. 13 more clearly shows the device cradle 3. Here by example and without limitation, the device cradle 3 is illustrated as including two of the structures 123 for receiving the mounting platform 103. The two of the attachment structures 123 permit the mounting platform 103 to be moved between different ends of the device cradle 3.

Here, the diamond-shaped attachment base 141 portion of the positionable mounting platform 103 is illustrated as having a pair of wings 153 on either side of the stem 143. The diamond-shaped attachment base 141 is thus structured to be fastened to the device cradle 3 through one of the attachment structures 123 with the part-spherical coupler 145 projected outwardly from the floor portion 121 of the device cradle 3. For example, a substantially planar mounting surface 155 of the diamond-shaped attachment base 141 is mated to the floor 121 of the device cradle 3. Thereafter, the mounting platform 103 is secured to the floor 121 of the device cradle 3 by a pair of the screws or other fasteners 129 through its pair of clearance holes 149 in the wings 153 of the diamond-shaped attachment base 141 and passing into the mating holes 151 formed in the attachment structure 123.

As illustrated here by example and without limitation, the attachment structure 123 is formed by the pair of fastener holes 151 which are spaced apart a distance X of about 1.912 inches + or − about 0.031 inches. The fastener holes 151 may be threaded holes structured to accept correspondingly threaded fastener 4 thereinto. Alternatively, the fastener holes 151 may be unthreaded holes in a plastic or soft metal material that are sized to accept correspondingly self-threading fasteners 129 thereinto. The fastener holes 151 also may be unthreaded clearance holes sized to accept corresponding fasteners 129 therethrough. By example and without limitation, the clearance fastener holes 151 are formed having a diameter Y of about $3/16$ inch diameter + or − about $1/16$ inch. Attachment structure materials substantially surrounding the fastener holes 151 form substantially flat and mutually coplanar resting surfaces 157. Additionally, a surface 159 of the cradle floor 121 is flush or recessed below the coplanar resting surfaces 157 of the attachment structure 123 so as to not interfere with mating of attachment base 141 when the positionable mounting platform 103 or other mounting device is coupled thereto.

Other device cradles are also currently known and may be substituted without deviating from the scope and intent of the present invention.

Figure 14:
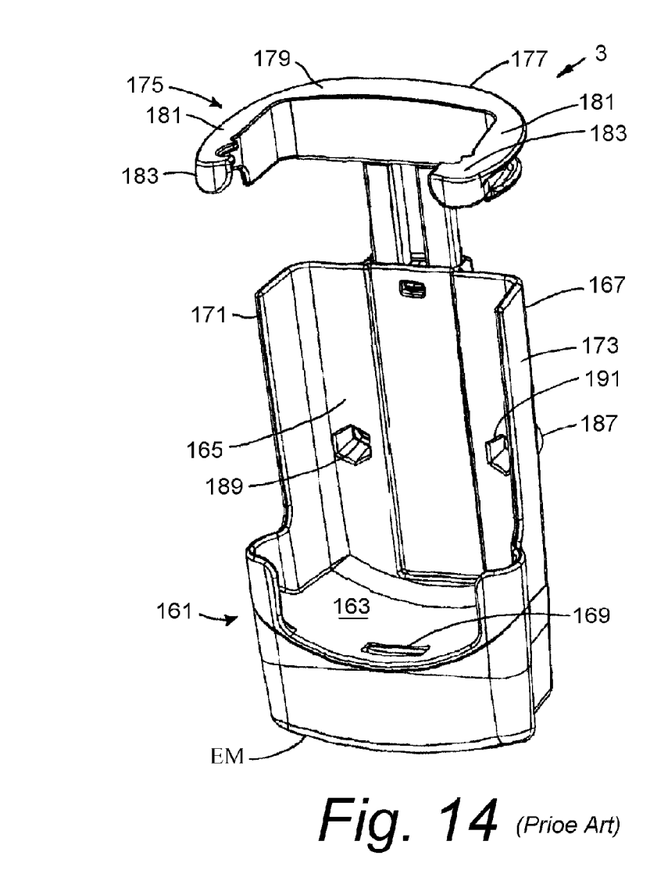
FIGS. 14 and 15 are front and rear views, respectively, that illustrate an example of an active type device cradle of a type disclosed in the prior art.
Figure 15:
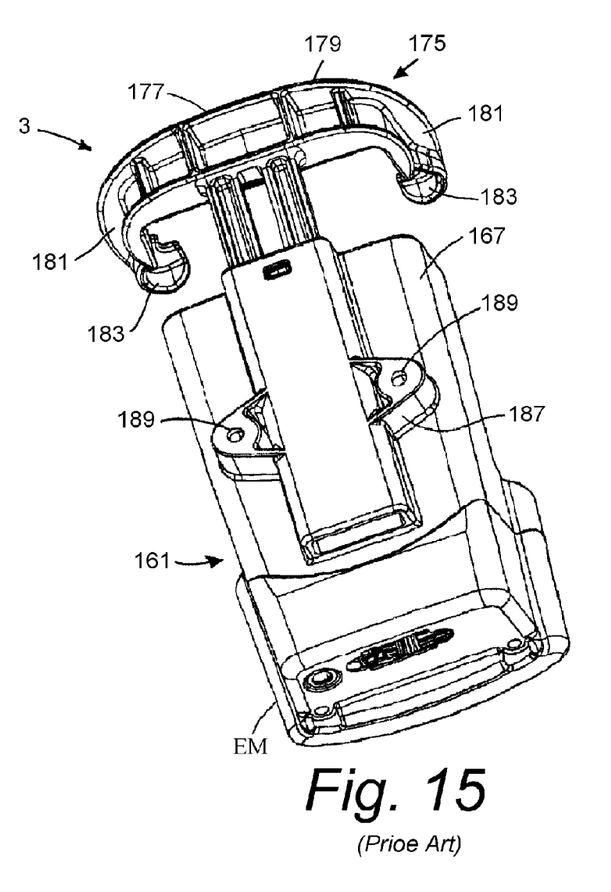

FIGS. 14 and 15 are front and rear views, respectively, that illustrate one example of an active type cradle disclosed in U.S. Pat. No. 7,017,243, SECURE INTERFACE CRADLE FOR POCKET PERSONAL COMPUTER DEVICE, issued Mar. 28, 2006, to the inventor of the present invention, which is incorporated by reference herein, discloses another device cradle 3 fitted with an electrical interface that brings power to the mobile electronic device E while also providing signal input/output (I/O) capability.

The electrical interface device cradle 3 is disclosed here as having a base 161 that is structured with a socket-shaped device rest 163 on a first front surface 165 of a stiff, "C" channel-shaped spine portion 167. The socket-shaped device rest 163 is structured for slidingly receiving one of the generally well-known mobile electronic devices E as illustrated in FIG. 12, such as a hand-held pocket-sized personal computer, commonly referred to as a "pocket PC," or another mobile electronic device, such as a cellular telephone, a mobile global positioning system (GPS) receiver, a Personal Digital Accessory (PDA) or another mobile electronic device such as are generally well-known. For example, the device rest 163 is formed as a socket-shaped receiver cavity or "pocket" for receiving portion 145 of the electronic device E. An appropriately positioned connector access port 169 is provided in the socket-shaped seat 14 for providing an electrical interface to an electronics module EM, as disclosed by example and without limitation in U.S. Pat. No. 7,017,243, which is incorporated by reference herein. The open C-channel-shaped spine portion 167 extends from the socket-shaped device rest 163 of the base 161. For example, contoured channel walls 171, 173 are spaced-apart on either side of the front surface 165 of the spine portion 167.

A device retainer structure 175 securely retains the mobile electronic device E in the device cradle 3 in a manner that permits the user a useful viewing relationship with the display screen D and a manipulating relationship with the facial key pad P. By example and without limitation, the retainer structure 175 shown here is provided by a spring-loaded or otherwise resiliently biased retention clamp 177 that is slidingly engaged with the spine portion 167 of the base 161 for contracting and expanding an open "C" channel-shaped jaw 179 relative to the socket-shaped device rest 163. For example, the jaw 179 includes a pair of "wings" 181 each terminating in a head portion 183 contoured to fit around the electronic device E. The retainer structure 175 is thus structured for positively engaging the inserted device E when the resiliently biased retention clamp 177 is contracted relative to the receiver pocket 141. Aspects of the electrical interface device cradle 3 are therefore structured to expose the facial key pad P and display screen D to the user.

As is generally well-known, pocket PCs and other mobile electronic devices E of the type illustrated in FIG. 12 and intended to be supported by the combination electrical interface apparatus and device cradle 3 often include an signal input/output (I/O) port located on a ported interface portion IP thereof, as illustrated in FIG. 12.

The electrical interface device cradle 3 is either permanently or semi-permanently installable as a vehicle support platform and removably attachable as by a belt to the user's person as a personal carrying apparatus. For example, a second back surface 185 of the spine portion 167 includes the device cradle 3 includes an integral attachment structure 187 for mounting the relatively positionable mounting platform 2. The attachment structure 187, which is more clearly illustrated in FIG. 15, is operated, for example, by fasteners 129 (not shown) passed through clearance holes 189 through the spine portion 167 of the base 161. The clearance holes 189 may be counter-bored to accept the fasteners. When the fasteners are configured with square or hex-shaped heads, the clearance holes 189 may include a counter-bore 191 with a matching square or hex shape (shown) for securing the fasteners against rotation while mating nuts are installed to secure the device cradle 3 to the diamond-shaped attachment base 141 of the relatively positionable mounting platform 103 of universal mounting apparatus 101.

Figures 16, 17:
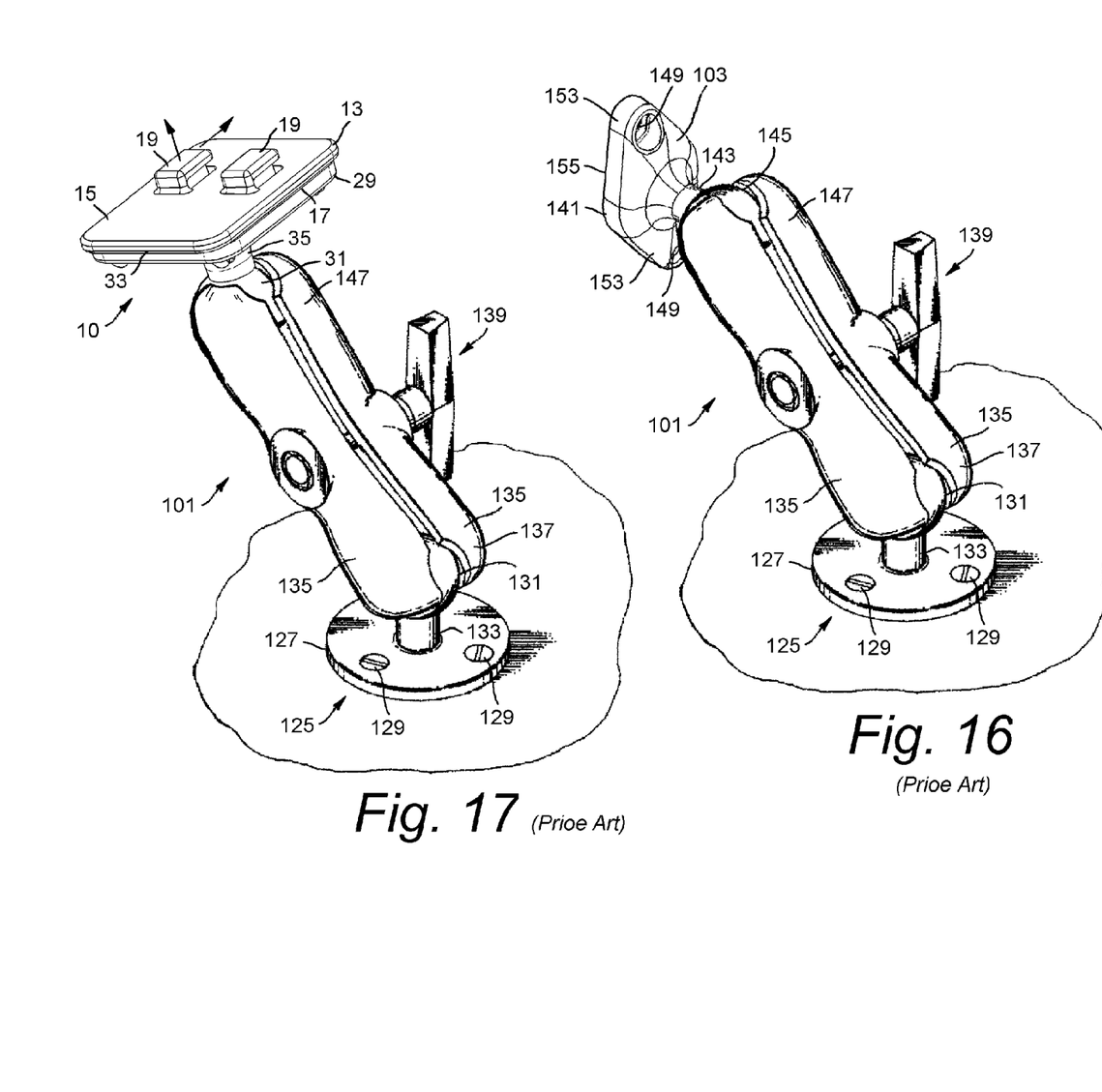
FIG. 16 illustrates an example of a universally positionable ball-and-socket mounting apparatus of a type disclosed in the prior art and having a relatively positionable mounting platform configured with a diamond-shaped attachment base for attachment of the device cradle of either the passive or the active type.
FIG. 17 illustrates the universally positionable ball-and-socket mounting apparatus having the relatively positionable mounting platform configured with a matching pair of T-slot connectors of a type disclosed herein.

FIG. 16 illustrates the universally positionable ball-and-socket or other universal mounting apparatus 101 having the relatively positionable mounting platform 103 configured with the diamond-shaped attachment base 141 for attachment of the device cradle 3 of either the passive or the active type, as disclosed herein.

Alternatively, the device cradle 3 is of the type incorporating the T-slot connector plate 1, as discussed herein.

FIG. 17 illustrates the universally positionable ball-and-socket or other universal mounting apparatus 101 having the relatively positionable mounting platform 103 configured with a matching pair of the T-slot connectors 19, as disclosed herein.

Alternatively, by example and without limitation, the novel quick release T-slot adaptor 10, as disclosed herein, is substituted for the relatively positionable mounting platform 103. Whether having either the mounting platform 103 configured with the T-slot connectors 19, or the substituted novel quick release T-slot adaptor 10, as disclosed herein, the mounting apparatus 101 is thus adapted for receiving any device cradle 3 configured with the T-slot connector plate 1.

Figures 18, 19:
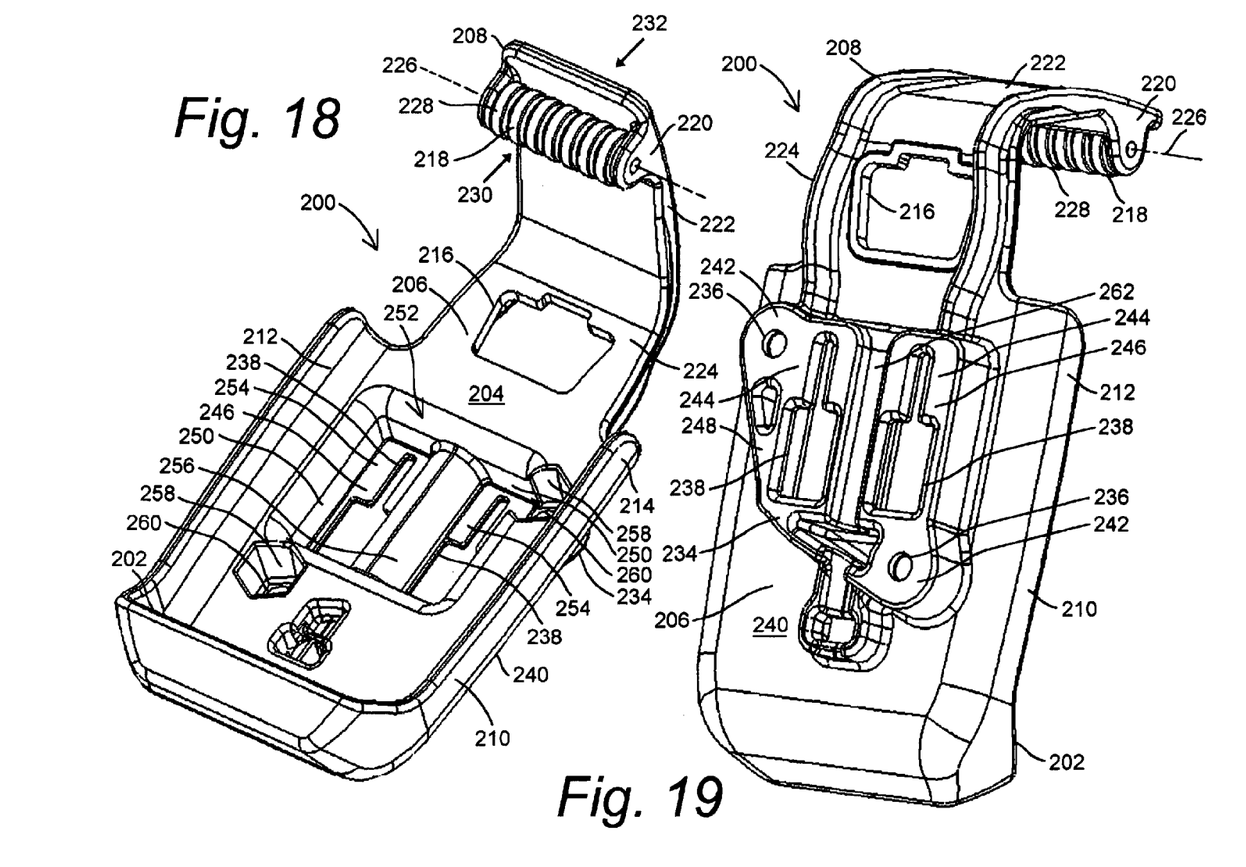
FIGS. 18 and 19 are front and rear pictorial views, respectively, of a novel device cradle that is configured with a novel dual attachment base for alternately securing the device cradle to a plurality of different external presentation apparatus, such as but not limited to the two different relatively positionable mounting platforms disclosed by example and without limitation in FIGS. 16 and 17.

FIGS. 18 and 19 are front and rear pictorial views, respectively, of a novel device cradle 200 that is configured for cradling the mobile electronic device E. A device rest or "pocket" 202 formed as a shelf on a first front surface 204 of a rigid spine portion 206, which provides footing for the mobile electronic device E, and a device retainer structure 208 securely retains the mobile electronic device E against the footing. By example and without limitation, the device rest 202 is a socket-shaped receiver cavity or "pocket" that is positioned adjacent to a first end of the spine 206 and is sized to receive and retain at least one of the different normally handheld portable electronic devices E. Optionally, the novel device cradle 200 is configured generally as the device cradle 3 of either the passive or the active type, as disclosed herein.

Alternatively, as illustrated here, the novel device cradle 200 is formed with a substantially rigid "C" channel-shaped back plane 210. For example, the open C-channel back plane 210 extends from the receiver pocket 202 and is structured with contoured channel walls 212, 214 spaced-apart on either side of the first front surface 204 of the stiff spine portion 206. An appropriately positioned connector access port 216 is optionally provided in the receiver pocket 202 (as illustrated in FIG. 14) or spine portion 206 (shown here) for providing an electrical interface to the electronic device E.

Optionally, the novel device cradle 200 is generally of a type disclosed by example and without limitation in either U.S. patent application Ser. No. 11/893,438, PORTABLE DEVICE HOLDER, filed in the name of the inventor of the present invention on Aug. 16, 2007, which is incorporated herein by reference, or U.S. patent application Ser. No. 12/074,944, PORTABLE DEVICE HOLDER, filed in the name of the inventor of the present invention on Mar. 8, 2008, which is a Continuation-in-part and claims priority benefit of copending parent U.S. patent application Ser. No. 11/893,438 and is incorporated herein by reference. Accordingly, the retainer structure 208 of the novel device cradle 200 is provided by one or more small rollers 218 rotatably coupled to a head portion 220 of one or more latching arms 222. Each latching arm 222 is a resiliently expandable arm that extends from the spine portion 206, expanding outwardly either from the channel walls 212, 214 on opposite sides of the spine portion 206, or from a distal portion 224 of the device cradle 200 opposite and spaced apart from the receiver pocket 202. Thus, each resiliently expandable latching arm 222 is flexible outwardly away from the spine 206 for receiving the device 12 into the receiver pocket 202. Each of the rollers 218 is rotatably coupled to the head portion 220 of the spring arm 222 such that it is rotatable about an axis 226 substantially aligned with the receiver pocket 202.

As illustrated by example and without limitation in U.S. patent application Ser. No. 11/893,438 and in U.S. patent application Ser. No. 12/074,944, both incorporated herein by reference, during the insertion (and removal) process of the electronic device E, only the rollers 218 contact the electronic device E. Spring pressure of the one or more expanded spring arms 222 causes the rollers 218 to substantially continuously follow contours of electronic device E. The rollers 218 have a circumference 228 that is sufficiently large relative to other components the head portion 220 generally such that contact with the electronic device E is effectively restricted to only the rollers 218 during both the insertion and removal processes. The rollers 218 remain in contact with the electronic device E until it is substantially seated against the spine portion 206 and appropriately seated in the receiver pocket 202. Thus, the rollers 218 protect the electronic device E from any contact with the unforgiving rigid material of the head portion 220 generally so that scratching and other potential damage to the electronic device E is avoided. Rolling motion of the rollers 218 over the electronic device E even ensures that even the surface finish of the electronic device E is protected even from scuffing. Accordingly, the rollers 218 are optionally either a soft rubbery material, such as neoprene, or a harder material, such as injection molded plastic. Either the soft rubbery material or the harder material can be used without damaging even the surface finish of the electronic device E.

Incorporation of the roller 218 with the head portion 220 also results in each spring arms 222 operating to compress the electronic device E into the device cradle 200. During progress toward the spine portion 206 of the device cradle 200, the electronic device E pushes the spring arms 222 outwardly of the spine portion 206, as indicated by arrow 230. The electronic device E continues to push the spring arms 222 outwardly of the spine portion 206 until it passes an equilibrium position relative to the rollers 218 when a maximum dimension of the electronic device E is aligned with the axes 226 of the rollers 218, as disclosed and illustrated in both U.S. patent application Ser. No. 11/893,438 and in U.S. patent application Ser. No. 12/074,944, which are both incorporated herein by reference. At this point during insertion of the electronic device E, the spring pressure of the expanded spring arms 222 causes each arm 222 to contract toward the spine portion 206 across the electronic device E, as indicated by arrow 232. The contours of the electronic device E become narrower past their maximum dimension permits the maximally expanded spring arms 222 to press the electronic device E toward the spine portion 206 by pressure of the contracting rollers 218, as indicated by arrow 232.

Additionally, the device cradle 200 includes a novel dual attachment base 234 having both a pair of fastener attachment holes 236 and a pair of spaced apart T-slots 238 for alternately securing the device cradle 200 to a plurality of different external presentation apparatus, such as but not limited to the diamond-shaped attachment base 141 of the relatively positionable mounting platform 103 disclosed by example and without limitation in FIG. 16, and the novel quick release T-slot adaptor 10 disclosed by example and without limitation in FIG. 17.

For example, as illustrated here by example and without limitation, the dual attachment base 234 is formed on a back surface 240 of the spine 206 opposite from the device rest 202 and retainer structure 208. The dual attachment base 234 can be positioned anywhere along the back surface 240 of the spine 206 without deviating from the scope and intent of the present invention. As illustrated here by example and without limitation, the dual attachment base 234 is optionally positioned generally between the respective positions of device rest 202 and retainer structure 208 adjacent to opposite ends of the spine 206. As illustrated here by example and without limitation, the dual attachment base 234 includes the pair of fastener attachment holes 236 spaced apart to match the pair of clearance holes 149 in the wings 153 of the diamond-shaped attachment base 141 of the relatively positionable mounting platform 103. The fastener holes 236 may be threaded holes structured to accept correspondingly threaded fasteners 129 thereinto. Alternatively, the fastener holes 236 may be unthreaded holes in a plastic or soft metal material that are sized to accept correspondingly self-threading fasteners 129 thereinto. The fastener holes 236 also may be unthreaded clearance holes sized to accept corresponding fasteners 129 therethrough.

The fastener attachment holes 236 are optionally formed anywhere on the dual attachment base 234 that does not interfere with the T-slots 238 and in any orientation relative to the T-slots 238 and spine 206 of the device cradle 200. By example and without limitation, the fastener holes 236 are optionally formed generally on opposite sides of the spine 206 adjacent to the spaced-apart channel walls 212, 214. Optionally, the fastener holes 236 are optionally oriented substantially diagonal of the spine 206, as illustrated. However, the fastener holes 236 may be alternatively substantially aligned along the spine 206. Other positions and orientations of the fastener holes 236 are also contemplated and may be substituted without deviating from the scope and intent of the present invention.

Attachment structure materials substantially surrounding the fastener holes 236 form substantially flat and mutually coplanar resting surfaces 242. Additionally, the back surface 240 of the of the spine 206 is flush or recessed below the coplanar resting surfaces 242 of the dual attachment base 234 so as to not interfere with attaching the substantially planar mounting surface 325 of the attachment base 141 when the positionable mounting platform 103 or other mounting device coupled thereto.

As discussed herein, the diamond-shaped base plate 15 is structured to be fastened to the device cradle 200 through the fastener holes 236 of the dual attachment base 234 with the part-spherical coupler 9 projected outwardly on its stem 16. For example, the ball mount mounting platform 103 is secured to the device cradle 200 by a pair of the screws or other fasteners 129 through the clearance holes 149 in the wings 153 of the diamond-shaped base plate 15 and passing into mating fastener attachment holes 236 form in the dual attachment base 234.

Additionally, the dual attachment base 234 includes the pair of spaced apart T-slots 238 for securing the device cradle 200 to respective T-slot connectors, such as the entirely integral T-slot connectors 19 of the novel quick release T-slot adaptor 10 disclosed herein. The T-slots 238 are optionally formed anywhere on the dual attachment base 234 that does not interfere with the fastener attachment holes 236 and in any orientation relative to the fastener holes 236 and spine 206 of the device cradle 200. By example and without limitation, the T-slots 238 are optionally oriented substantially aligned along the spine 206 and positioned generally between the substantially diagonal fastener holes 236. However, other orientations and positions of the T-slots 238 are also contemplated and may be substituted without deviating from the scope and intent of the present invention.

Attachment structure materials substantially surrounding the T-slots 238 form substantially flat and mutually coplanar resting surfaces 244. Additionally, the resting surfaces 242 and 244 of the respective fastener holes 236 and T-slots 238 are mutually coplanar so as to avoid interference with attachment of either the diamond-shaped base plate 15 of the ball mount mounting platform 103, or the T-slot connectors 19 of the novel quick release T-slot adaptor 10. Thus, the pair of spaced apart T-slots 238 is combined with the pair of spaced apart fastener attachment holes 236 in a single dual attachment base 234 that alternately accepts either the screw-on diamond-shaped base plate 15 of the ball mount mounting platform 103, or the slip-on T-slot connectors 19 of the novel quick release T-slot adaptor 10.

Furthermore, the single dual attachment base 234 may optionally include a plurality of either or both of the pairs of spaced apart T-slots 238, or the pairs of spaced apart fastener attachment holes 236 so that the quick release T-slot adaptor 10 or the ball mount mounting platform 103 can be relocated to different positions on the device cradle 200.

The dual attachment base 234 is structured to include space to fit the hook plates 21 of the T-slot connectors 19 behind the mobile electronic device E when the surface 15 of the adaptor base plate 13 is fit against the resting surfaces 244. By example and without limitation, the dual attachment base 234 includes an attachment plate 246 that is adapted to contain the pair of spaced apart T-slots 238 formed therethrough with the resting surfaces 244 formed on its outer surface 248. The attachment plate 246 is raised or spaced away from the back surface 240 of the spine 206. For example, a plurality of side walls 250 are formed between the back surface 240 of the spine 206 and the attachment plate 246 raising it up and spacing it away from the back surface 240 of the spine 206. The plurality of side walls 250 thus offset the attachment plate 246 from the second back surface 240 of the spine 206. As illustrated here by example and without limitation, the plurality of side walls 250 also form a relief or "pocket" 252 between the front surface 204 of the spine 206 and an interior surface 254 of the attachment plate 246 at least in areas adjacent to each of the T-slots 238.

A stiffener 256 is optionally provided to stiffen the attachment plate 246 in the area of the T-slots 238. By example and without limitation, the stiffener 256 is formed on the interior surface 254 of the attachment plate 246 between the T-slots 238.

The attachment plate 246 of the dual attachment base 234 is further adapted to contain the pair of fastener attachment holes 236 formed therethrough with the resting surfaces 242 for the attachment base 141 of the ball mount mounting platform 103 being formed on its outer surface 248. The plurality of side walls 250 thus also space the resting surfaces 242 around the fastener holes 236 away from the back surface 240 of the spine 206 so that the screws or other fasteners 129 attaching the ball mount mounting platform 103 to the device cradle 200 do not interfere with the electronic device E.

When the attachment holes 236 are clearance holes for the fasteners 129, the dual attachment base 234 further includes a relief 258 formed adjacent to an interior surface 260 of the attachment plate 246 and substantially surrounding each of the pair of fastener holes 236. By example and without limitation, the reliefs 258 are optionally square or hexagonal (shown) to receive respective square or hex nuts coupled to the fasteners 129. The reliefs 258 may also be sized to restrain the nuts from turning when the fasteners 129 are engaged for securing the attachment base 141 of the ball mount mounting platform 103 to the device cradle 200.

When the device cradle 200 includes the connector access port 216, the dual attachment base 234 optionally includes a channel 262 spaced below the resting surfaces 244 and 242 around the respective T-slots 238 and fastener holes 236. Optionally, as illustrated here, the channel 262 is substantially aligned with the spine 206 of the device cradle 200 and extended between the spaced apart T-slots 238 and fastener holes 236.

Figures 20, 21:
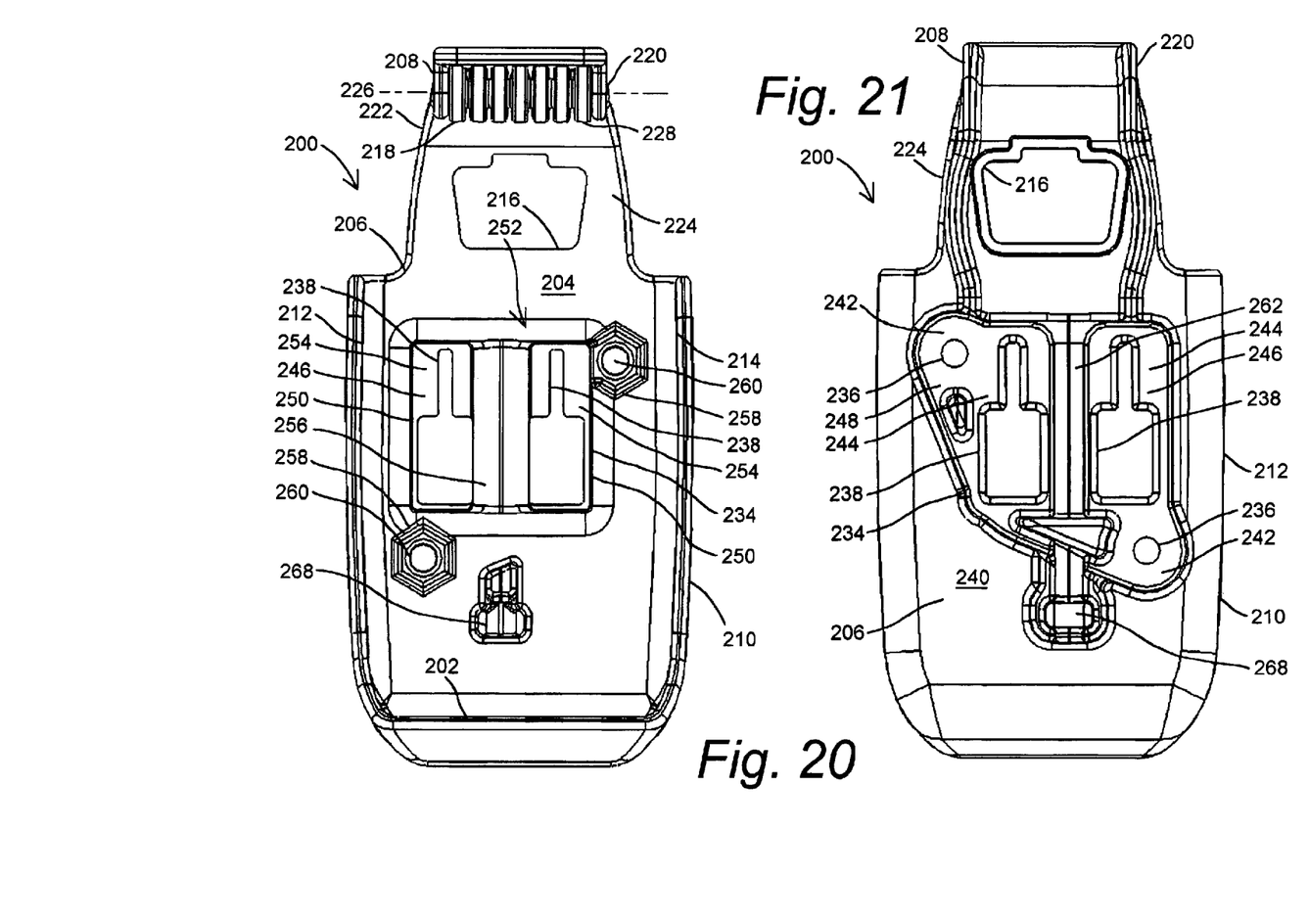

FIGS. 20 and 21 are elevation views of the device cradle 200, wherein FIG. 20 shows the relief or "pocket" 252 between the attachment plate 246 and the front surface 204 of the spine 206, and FIG. 21 shows the attachment plate 246 from its outer surface 248.

Figures 22, 23:
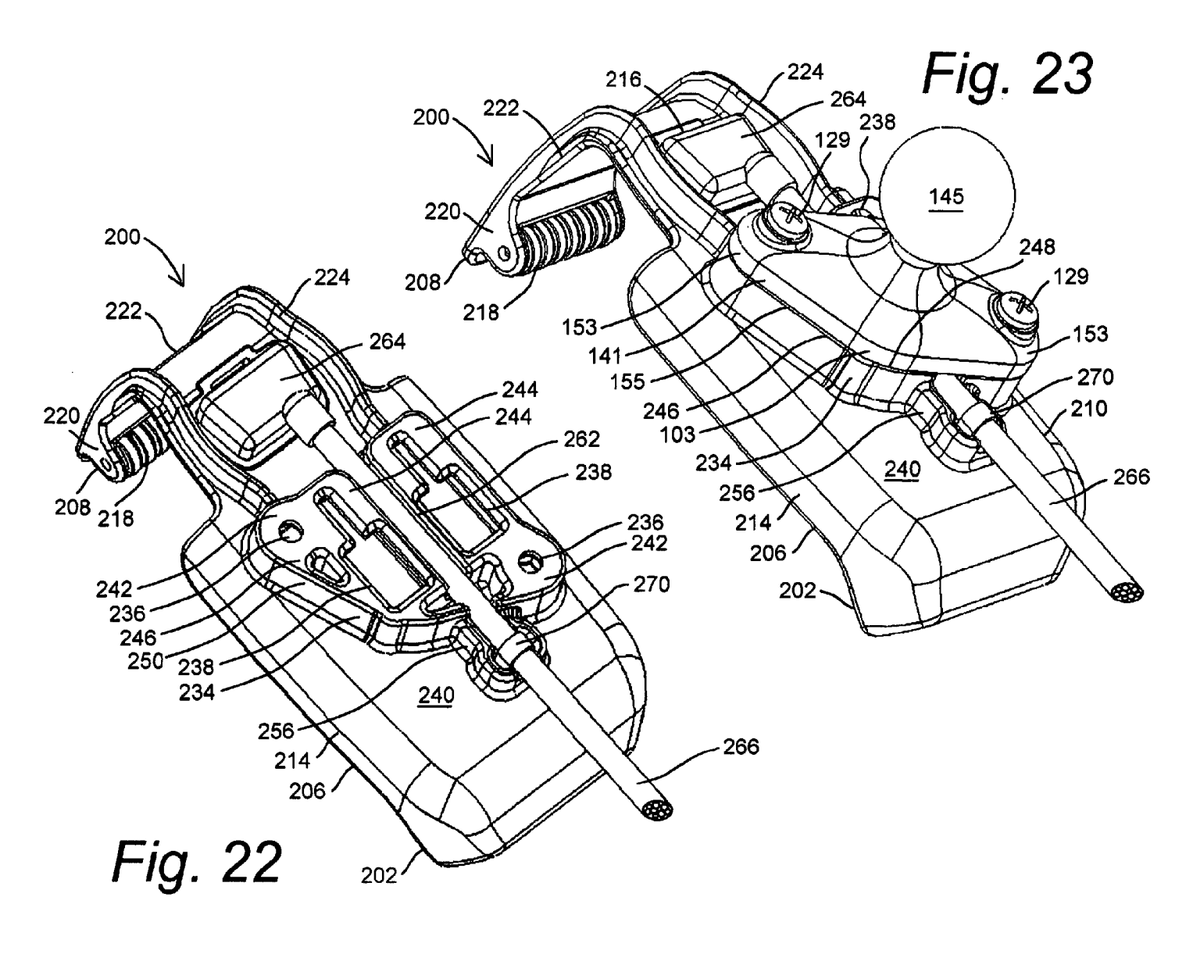

FIGS. 22 and 23 are pictorial views of the device cradle 200 having an electronics interface module or connector 264 coupled into the access port 216, wherein FIG. 22 shows the attachment plate 246 being prepared to receive the T-slot connectors 19 of the novel quick release T-slot adaptor 10 into the pair of T-slots 238, and FIG. 23 shows the attachment plate 246 having the diamond-shaped base plate 15 of the ball mount mounting platform 103 mounted on its outer surface 248 with two of the screw fasteners 129.

As illustrated in both FIGS. 22 and 23, the access port 216 is formed in the spine portion 206 for providing an electrical interface to the electronic device E. Here, the channel 262 is sized to receive an electronics I/O cable 266 coupled to the interface module or connector 264 and space it below the resting surfaces 244 and 242 around the respective T-slots 238 and fastener holes 236 so that it does not interfere with either attachment of the T-slot connectors 19 of the novel quick release T-slot adaptor 10 into the pair of T-slots 238, or attachment of the diamond-shaped base plate 15 of the ball mount mounting platform 103. Furthermore, the channel 262 optionally includes a cable tie anchor 268 structured for anchoring a cable tie 270 around the electronics I/O cable 266 for retaining it in the channel 262. The cable tie 270 also operates as a strain relief for the electronics I/O cable 266 for relieving potential strain on the interface module or connector 264.

As illustrated by FIGS. 22 and 23, the dual attachment base 234 makes simple the changing between a fixed mounting platform such as the ball mount mounting platform 103 and a quick release mounting platform such as the quick release T-slot adaptor 10 by merely removing a pair of screws or other fasteners 129. Therefore, the device cradle 200 can be either substantially permanently mounted, else quick release mounted, and switched between the choices in just a moment according to the user's preference.

Furthermore, when used with novel quick release T-slot adaptor 10, as disclosed herein, the user receives both the universal positioning capability of the ball mount mounting platform 103 of the type disclosed by example and without limitation in by example and without limitation in U.S. Pat. No. 5,845,885, as well as quick release functionality of the quick release T-slot adaptor 10 disclosed herein.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A device cradle, comprising:
    a substantially rigid spine;
    a device rest formed on a front surface of the spine and positioned adjacent to a first end thereof;
    a device retainer formed on the front surface of the spine and positioned adjacent to a second end thereof opposite from the device rest;
    a dual attachment base formed on a back surface of the spine opposite from the front surface thereof and positioned between the first and second ends thereof, the dual attachment base comprising:
       a raised attachment plate spaced away from the back surface of the spine,
       a pair of spaced apart fastener attachment holes formed through the attachment plate and positioned adjacent to opposite front and back surfaces of the spine, and
       a pair of spaced apart T-slots formed through the attachment plate and positioned substantially between the attachment holes.

2. The cradle of claim 1 wherein the dual attachment base further comprises a relief formed between the front surface of the spine and an interior surface of the attachment plate adjacent to the pair of T-slots.

3. The cradle of claim 2 wherein the dual attachment base further comprises a stiffener formed between the spaced apart T-slots.

4. The cradle of claim 3 wherein the stiffener formed between the spaced apart T-slots of the dual attachment base further comprises a channel extended between the spaced apart T-slots.

5. The cradle of claim 2 wherein the dual attachment base further comprises a relief formed adjacent to an interior surface of the attachment plate and substantially surrounding each of the pair of attachment holes.

6. The cradle of claim 2 wherein one of the device rest and the spine further comprises a connector access port.

7. The cradle of claim 2 wherein the pair of attachment holes formed through the attachment plate is further oriented substantially diagonal of the spine and the pair of T-slots; and
    the dual attachment base further comprises:
       a plurality of side walls formed between the back surface of the spine and the raised attachment plate and spacing the raised attachment plate away from the second side of the spine, the plurality of side walls forming the relief between the front surface of the spine and the interior surface of the attachment plate adjacent to the pair of T-slots;
       a channel extended between the spaced apart T-slots; and
       a substantially hexagonal relief surrounding each of the pair of attachment holes between the front surface of the spine and an interior surface of the attachment plate.

8. The cradle of claim 7 wherein the spine further comprises a connector access port formed therethrough between one of the first and second ends thereof and the dual attachment base.

9. A device cradle, comprising:
    a device rest and a device retainer both formed on a front surface of a rigid spine portion, the device retainer being spaced away from the device rest and being adapted for retaining a mobile electronic device therebetween;
    a dual attachment base formed on the spine portion external of the device rest and device retainer, the dual attachment base comprising:
       an attachment plate spaced away from the front surface of the spine portion,
       a pair of spaced apart fastener holes formed in the attachment plate, and
       a pair of spaced apart T-slots formed through the attachment plate.

10. The cradle of claim 9 wherein the dual attachment base further comprises a wall formed between the attachment plate and a back surface of the spine portion opposite from the front surface thereof, the wall spacing the attachment plate away from the front surface of the spine portion.

11. The cradle of claim 10 wherein the dual attachment base further comprises a relief between the front surface of the spine and an interior surface of the attachment plate at least in an area adjacent to each of the T-slots.

12. The cradle of claim 11 wherein the dual attachment base further comprises a channel formed between the front surface of the spine and an exterior surface of the attachment plate.

13. The cradle of claim 12, further comprising a relatively positionable mounting platform, the relatively positionable mounting platform comprising:
    a part-spherical coupler,
    an attachment base, and
    a stem coupling the part-spherical coupler to the attachment base in a spaced apart relationship therewith.

14. The cradle of claim 13, further comprising a quick release T-slot adaptor, the quick release T-slot adaptor comprising:
    a substantially rigid adaptor base plate having first and second substantially planar and parallel spaced apart opposing surfaces,
    a substantially rigid T-slot connector incorporated in the adaptor base plate, the T-slot connector having:
       a hook plate spaced away from the first surface of the adaptor base plate and substantially parallel therewith,
       a stop plate extended substantially perpendicularly between the hook plate and the first surface of the adaptor base plate, and
       a guide plate positioned substantially central of the hook plate substantially perpendicular to the stop plate and extended substantially perpendicularly between the hook plate and the first surface of the adaptor base plate; and
    a plurality of quick release connectors provided on the second surface of the adaptor base plate opposite from the T-slot connector; and
    wherein the attachment base of the relatively positionable mounting platform further comprises a plurality of quick release connector receivers, the plurality of quick release connector receivers being positioned in a mating relationship with the plurality of quick release connectors of the quick release T-slot adaptor.

15. A method for mounting a device cradle, the method comprising:

in a device cradle comprising a pair of spaced apart fastener holes formed in an attachment plate thereof and a pair of spaced apart T-slots formed through the attachment plate, fitting each of the T-slots over respective T-slot connectors and securing the T-slots relative to the respective T-slot connectors; and alternately joining a first positionable mounting platform to the attachment plate, comprising coupling a pair of fasteners between the pair of fastener holes in the attachment plate and an attachment base portion of the first positionable mounting platform with a first part-spherical coupler of the first positionable mounting platform projected away from the attachment plate.

16. The method of claim 15 wherein the fitting each of the T-slots over respective T-slot connectors further comprises fitting each of the T-slots over respective T-slot connectors of a quick release T-slot adaptor comprising the T-slot connectors formed on a first surface of a substantially rigid adaptor base plate thereof.

17. The method of claim 16, further comprising projecting a second part-spherical coupler away from a second surface of the adaptor base plate of the quick release T-slot adaptor opposite from the first surface thereof.

18. The method of claim 17 wherein the projecting a second part-spherical coupler away from a second surface of the adaptor base plate further comprises securing a second positionable mounting platform comprising the second part-spherical coupler to the adaptor base plate with an attachment base portion of the second positionable mounting platform adjacent to the second surface of the adaptor base plate and the second part-spherical coupler projected away from the second surface of the adaptor base plate on the attachment plate of the second positionable mounting platform.

19. The method of claim 18, further comprising, with the second positionable mounting platform comprising the second part-spherical coupler being secured to the adaptor base plate with the attachment base portion thereof being adjacent to the second surface of the adaptor base plate and the second part-spherical coupler projected away from the second surface of the adaptor base plate, substantially capturing the second part spherical coupler in a relatively rotatable relationship with a socket of a universal mounting apparatus.

20. The method of claim 15, further comprising, with the first positionable mounting platform joined to the attachment plate with the first part-spherical coupler projected away from the attachment plate thereof, substantially capturing the first part spherical coupler in a relatively rotatable relationship with a socket of a universal mounting apparatus.

\* \* \* \* \*